United States Patent
Zhang et al.

(10) Patent No.: US 11,536,861 B2
(45) Date of Patent: Dec. 27, 2022

(54) THREE-DIMENSIONAL NET-TYPE MONITORING SYSTEM AND METHOD FOR UNDERWATER LANDSLIDE DEFORMATION

(71) Applicant: CHINA UNIVERSITY OF GEOSCIENCES (WUHAN), Wuhan (CN)

(72) Inventors: Junrong Zhang, Wuhan (CN); Huiming Tang, Wuhan (CN); Yongquan Zhang, Wuhan (CN); Changdong Li, Wuhan (CN); Qing Zhang, Wuhan (CN); Junwei Ma, Wuhan (CN); Ding Xia, Wuhan (CN); Chengyuan Lin, Wuhan (CN); Sha Lu, Wuhan (CN)

(73) Assignee: CHINA UNIVERSITY OF GEOSCIENCES (WUHAN), Wuhan (CN)

( * ) Notice: Subject to any disclaimer, the term of this patent is extended or adjusted under 35 U.S.C. 154(b) by 10 days.

(21) Appl. No.: 17/367,589

(22) Filed: Jul. 5, 2021

(65) Prior Publication Data

US 2022/0365234 A1    Nov. 17, 2022

Related U.S. Application Data

(63) Continuation of application No. PCT/CN2021/098094, filed on Jun. 3, 2021.

(30) Foreign Application Priority Data

May 14, 2021 (CN) .......................... 202110527710.X (51) Int. Cl.
*G01V 1/00* (2006.01)

(52) U.S. Cl.
CPC .................................... *G01V 1/008* (2013.01)

(58) Field of Classification Search
CPC ...................................................... G01V 1/008
See application file for complete search history.

(56) References Cited

U.S. PATENT DOCUMENTS 8,265,376 B2   9/2012   Tsuk et al.
8,610,761 B2   12/2013  Haisty et al.
(Continued)

FOREIGN PATENT DOCUMENTS

CN    109537650 A    3/2019

*Primary Examiner* — Elias Desta
(74) *Attorney, Agent, or Firm* — True Shepherd LLC; Andrew C. Cheng (57) ABSTRACT

A plurality of multifunctional underwater 3D displacement meters are arranged in a lattice and connected sequentially; four rotation shafts may be rotatably mounted in a housing and extend in a vertical direction, one end of the rotation shaft and the housing are connected to a compressible spring, four perforations penetrate the housing in a circumferential direction at intervals, the metallic lines correspond to the perforations one to one, one end of the metallic line is wound around the rotation shaft, and the other end thereof penetrates out of the perforation and is connected to the metallic line of the adjacent 3D displacement meter; and the displacement meter corresponds to the metallic line for measuring a take-up and pay-off length of the metallic line, and a three-axis acceleration sensor and a fluxgate monitor inclination angle change and azimuth angle change of the 3D displacement meter.

10 Claims, 6 Drawing Sheets

(56) References Cited

U.S. PATENT DOCUMENTS

| | | |
|---|---|---|
| 9,332,251 B2 | 5/2016 | Haisty et al. |
| 9,582,987 B2 * | 2/2017 | Eskildsen ............... G01F 23/76 |
| 2011/0012728 A1 * | 1/2011 | McCane ............... G01S 5/0027 33/366.12 |
| 2012/0101729 A1 * | 4/2012 | Cho ....................... G01V 1/008 702/2 |

* cited by examiner

THREE-DIMENSIONAL NET-TYPE MONITORING SYSTEM AND METHOD FOR UNDERWATER LANDSLIDE DEFORMATION

CROSS REFERENCE TO RELATED APPLICATION(S)

This application is a continuation of International Patent Application No. PCT/CN2021/098094 with a filing date of Jun. 3, 2021, designating the United States, now pending, and further claims priority to Chinese Patent Application No. 202110527710.X with a filing date of May 14, 2021. The content of the aforementioned applications, including any intervening amendments thereto, are incorporated herein by reference.

TECHNICAL FIELD

The present disclosure relates to the technical field of landslide disaster monitoring, and particularly relates to a three-dimensional net-type monitoring system and method for underwater landslide deformation.

BACKGROUND

There are vast mountainous regions in the world. With sufficient rainwater, geological disasters occur frequently, resulting in huge human and financial losses every year, and landslide disasters account for about ⅔ of the total number of the geological disasters. Water, as an important inducing factor of geological landslide disasters, is an important aspect for monitoring the geological landslide disasters. In recent years, a large number of ancient landslides re-occur due to periodic fluctuation of the water level of the Three Gorges reservoir. Therefore a corresponding monitoring means to continuously monitor features of reservoir landslide deformation is an important foundation for prevention and control of geological landslide disasters and is an essential premise for prediction and early warning of geological landslide disasters.

Underwater sliding mass is one significant aspect for monitoring reservoir landslide deformation. In decades, the landslide deformation monitoring technology has been continuously developing, a large number of monitoring means including GPS, total station, TDR, embedded optical fiber arrangement, borehole inclination measurement, Insar, near-ground photography, etc. are discovered and developed, and produce a certain monitoring effect. However, owing to the challenges of underwater landslide deformation monitoring, for example, waterproofing, underwater deformation feature acquisition, etc., none of the conventional monitoring techniques can be effectively applied in underwater environments. A set of solution and monitoring apparatus for monitoring features of sliding mass deformation under water level fluctuation at the front edge of a landslide is provided for meeting the requirements of large deformation, long endurance, high precision and high reliability during underwater deformation monitoring, which has great significance for medium and long-term prediction and forecasting of the landslide and prevention and control of landslide disasters.

SUMMARY

In view of this, the embodiments of the present disclosure provide a three-dimensional net-type monitoring system and method for underwater landslide deformation for solving the above problems.

The embodiments of the present disclosure provide a three-dimensional net-type monitoring system for underwater landslide deformation, including a plurality of overwater monitoring stations and a plurality of multifunctional underwater 3D displacement meters;

where the plurality of multifunctional underwater 3D displacement meters are arranged in a lattice, connected sequentially, and fixed to a surface of an overwater sliding mass and a surface of an underwater sliding mass, each of the overwater monitoring stations is fixedly connected to one multifunctional underwater 3D displacement meter on the surface of the overwater sliding mass, at least three multifunctional underwater 3D displacement meters are located on the surface of the overwater sliding mass and located on different straight lines, and a GPS device is arranged on the overwater monitoring station and is used for acquiring spatial positions of the multifunctional underwater 3D displacement meters on the surface of the overwater sliding mass;

the multifunctional underwater 3D displacement meter includes a housing, four rotation shafts, four metallic lines, four displacement meters and a sensor assembly; the four rotation shafts are rotatably mounted in the housing and extend in a vertical direction, one end of the rotation shaft and the housing are connected to a compressible spring, four perforations penetrate the housing in a circumferential direction at intervals, the metallic lines correspond to the perforations in a one-to-one manner, one end of the metallic line is wound around the rotation shaft, and the other end thereof penetrates out of the perforation and is connected to the metallic line of the adjacent multifunctional underwater 3D displacement meter; and the displacement meters are fixed in the housing, each displacement meter corresponds to the metallic line for measuring a take-up and pay-off length of the metallic line, and the sensor assembly includes a three-axis acceleration sensor and a fluxgate, the three-axis acceleration sensor and the fluxgate being fixed in the housing and used for monitoring inclination angle change and azimuth angle change of the multifunctional underwater 3D displacement meter respectively.

Further, the displacement meter may include a light-emitting element, a photosensitive element and optical grating discs, each grating disc being coaxially fixed on each rotation shaft, the rotation shaft rotating to drive the optical grating disc to rotate, the light-emitting element and the photosensitive element being located on an upper side and a lower side of the optical grating disc respectively and fixed in the housing, and the photosensitive element being used for acquiring a rotation distance of the optical grating disc so as to acquire the take-up and pay-off length of the metallic line.

Further, a partition plate may be arranged in the housing to form a displacement meter cavity and a sensor cavity one above the other, the displacement meter being located in the displacement meter cavity, and the sensor assembly being located in the sensor cavity.

Further, the light-emitting element may be located in the displacement meter cavity, the photosensitive element may be located in the sensor cavity, and a light hole may penetrate a position, opposite the light-emitting element, of the partition plate.

Further, a hub may be fixed on the rotation shaft, and one end of the metallic line may be wound around the hub.

Further, a groove may be provided in a position, opposite the rotation shaft, of the housing, the rotation shaft may be mounted in the groove, and the rotation shaft and at least one groove may be internally connected to the compressible spring.

Further, the sensor assembly may further include a water temperature sensor located in the housing for monitoring water temperature, and/or further include a micro camera, a transparent monitoring window may be arranged on a side wall of the sensor cavity, and the micro camera may be fixed to an inner side of the transparent monitoring window and used for observing an erosion state of the underwater sliding mass.

Further, an integrated circuit board may be fixed in the housing, the integrated circuit board being electrically connected to a water temperature sensor, a three-axis acceleration sensor, a fluxgate, a displacement meter, a micro camera and a photosensitive element for collecting, processing and transmitting monitoring data.

Further, the overwater monitoring station may be provided with a solar power supply device, and the solar power supply device is electrically connected to all apparatuses in the multifunctional underwater 3D displacement meter and supplying power continuously in the monitoring process; and/or, the overwater monitoring station may be provided with a communication module, a data transceiver may be fixed in the housing, the data transceiver may be electrically connected to the integrated circuit board and may be in communication connection with the communication module, and the communication module may be used for acquiring monitoring information of the multifunctional underwater 3D displacement meter and sending the monitoring information to a mobile monitoring terminal or a network by means of general packet radio service (GPRS).

The embodiments of the present disclosure further provide a monitoring method, including the following steps:

S1, determining, on the basis of early-stage exploration, a position of a landslide needing to be monitored, and determining a specific monitoring position of the landslide through paying off;

S2, numbering multifunctional underwater 3D displacement meters, then connecting the multifunctional underwater 3D displacement meters in a latticed mode by the metallic line to form a net, and arranging the multifunctional underwater 3D displacement meters on a surface of an overwater sliding mass and a surface of an underwater sliding mass, where at least three multifunctional underwater 3D displacement meters which are located on different straight lines are reserved on the surface of the overwater sliding mass during arrangement;

S3, connecting an overwater monitoring station to the multifunctional underwater 3D displacement meter on the surface of the overwater sliding mass fixedly; and S4, after energization, acquiring position data of each overwater monitoring station by a GPS apparatus of the overwater monitoring station, monitoring inclination angle change of each of the multifunctional underwater 3D displacement meters by a three-axis acceleration sensor, and monitoring azimuth angle change of each of the multifunctional underwater 3D displacement meters by a fluxgate, so as to monitor change of a single-node spatial attitude, and acquiring a take-up and pay-off length of a metallic line by a displacement meter, so as to calculate a distance between two adjacent multifunctional underwater 3D displacement meters, and monitor a deformation state of the landslide below the water surface in real time.

The technical solution provided by the embodiments of the present disclosure brings the beneficial effects that similar to the view of the finite element, based on a net-type monitoring method, evolution features of the underwater landslide deformation may be indirectly obtained by sensing and monitoring change of spatial states of a large number of points on the surface of the landslide and performing inversion integral calculation. Thus, the present disclosure is a beneficial supplement to existing landslide displacement monitoring means. Sensors involved in the method are mature technologies and have simple structures and reasonable design.

The provided underwater space for landslide deformation monitoring is stable and safe, and may protect internal monitoring sensors and supply power while coordinately deforming with surrounding rock and soil bodies, thereby achieving long-time and whole-process tracking and monitoring of underwater landslide deformation.

Multi-parameter monitoring of a slope surface of the underwater sliding mass of the landslide, including an erosion state of a slope surface of an underwater sliding mass, deformation parameters of the slope surface of the underwater sliding mass, etc., may be achieved, which is beneficial to clarifying and determining a development trend of different stages of the landslide displacement, and enriches and verifies an existing prediction method of the landslide.

In the figures: overwater monitoring station 1, monitoring pier 11, solar power supply device 12, GPS device 13, communication module 14, multifunctional underwater 3D displacement meter 2, housing 201, perforation 201a, fixing screw 202, top cover 203, light-emitting element 204, compressible spring 205, hub 206, optical grating disc 207, rotation shaft 208, metallic line 209, displacement meter cavity 210, light hole 211, sensor cavity 212, transparent monitoring window 213, micro camera 214, three-axis acceleration sensor 215, fluxgate 216, water temperature sensor 217, data transceiver 218, photosensitive element 219, integrated circuit board 220, bottom cover 221, wire hole 222, waterproof wire 223, sliding mass 3, and water surface 4.

DETAILED DESCRIPTION OF THE EMBODIMENTS

In order to make the objectives, technical solutions and advantages of the present disclosure clearer, the implementations of the present disclosure are described in more detail below with reference to the accompanying drawings.

With reference to FIGS. 1-4, the embodiments of the present disclosure provide a three-dimensional net-type monitoring system for underwater landslide deformation, including a plurality of overwater monitoring stations 1 and a plurality of multifunctional underwater 3D displacement meters 2.

Figure 1:
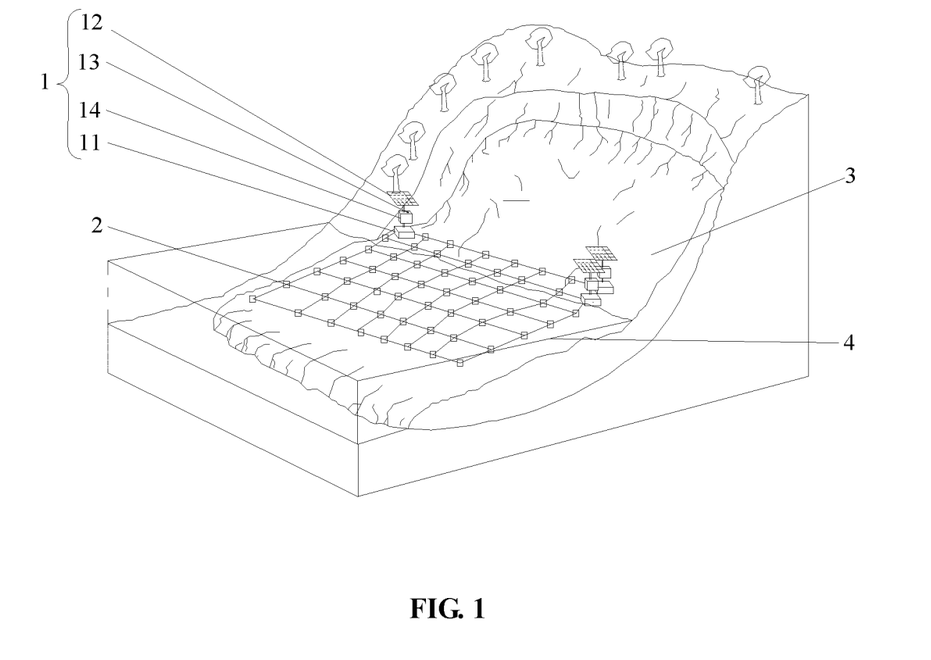
FIG. 1 is a schematic structural diagram of an embodiment of a three-dimensional net-type monitoring system for underwater landslide deformation provided by the present disclosure.

The plurality of multifunctional underwater 3D displacement meters 2 are arranged in a lattice, connected sequentially, and fixed to a surface of an overwater sliding mass 3 and a surface of a underwater sliding mass 3 for monitoring an evolution process of underwater landslide deformation. Each of the overwater monitoring stations 1 is fixedly connected to one multifunctional underwater 3D displacement meter 2 on the surface of the overwater sliding mass 3, at least three multifunctional underwater 3D displacement meters 2 are located on the surface of the overwater sliding mass 3 and located on different straight lines, and in this embodiment, three overwater monitoring stations 1 are provided. A GPS device 13 is arranged on the overwater monitoring station 1 and is used for acquiring spatial positions of the multifunctional underwater 3D displacement meters 2 on the surface of the overwater sliding mass 3.

The overwater monitoring station 1 includes a monitoring pier 11, the monitoring pier 11 is fixedly connected to the multifunctional underwater 3D displacement meter 2 after being poured and solidified, the monitoring pier 11 is located over the multifunctional underwater 3D displacement meter 2 vertically, the GPS device 13, the solar power supply device 12 and the communication module 14 are fixed to the monitoring pier 11, and the communication module 14 is used for acquiring monitoring information of the multifunctional underwater 3D displacement meter 2 and sending the monitoring information to a mobile monitoring terminal or a network by means of GPRS. The solar power supply device 12 is electrically connected to all apparatuses in the multifunctional underwater 3D displacement meter 2, the GPS device 13 and the communication module 14, and supplies power continuously to the multifunctional underwater 3D displacement meter 2, the GPS device 13 and the communication module 14 in the monitoring process.

Figure 2:
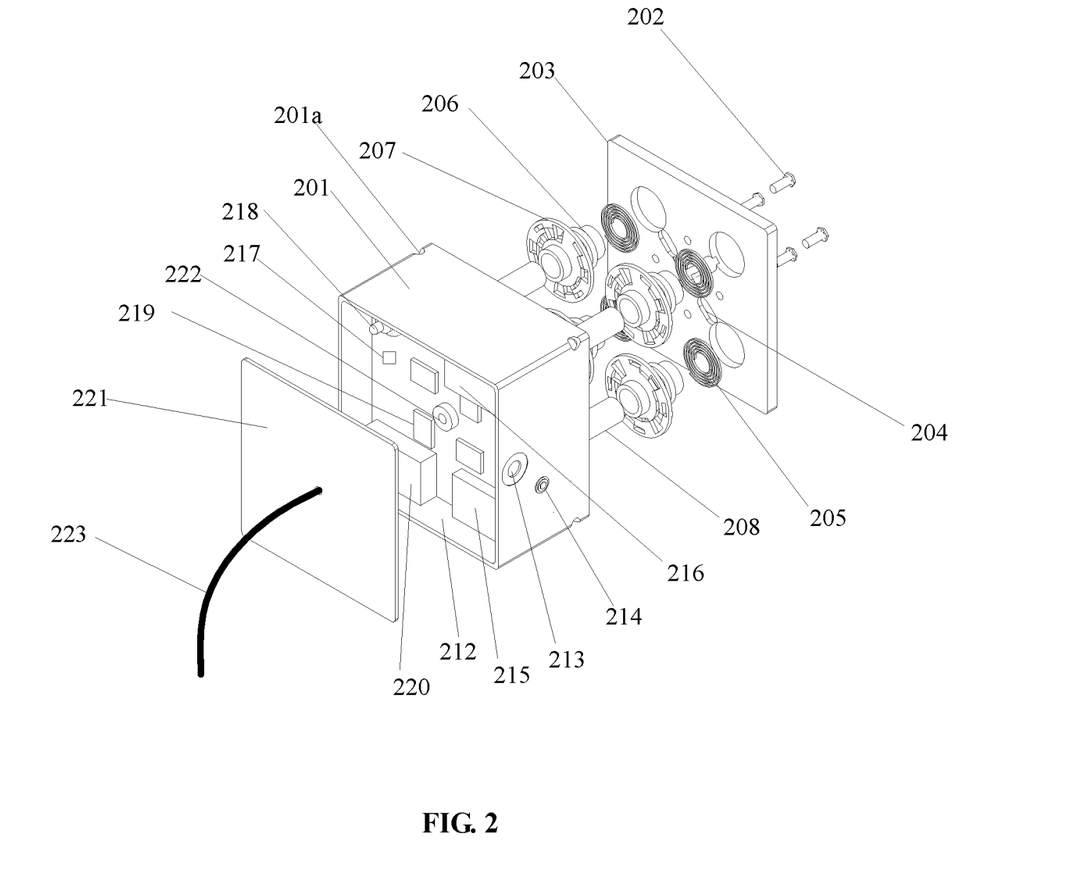
FIG. 2 is an exploded view of a multifunctional underwater 3D displacement meter of FIG. 1.
Figure 3:
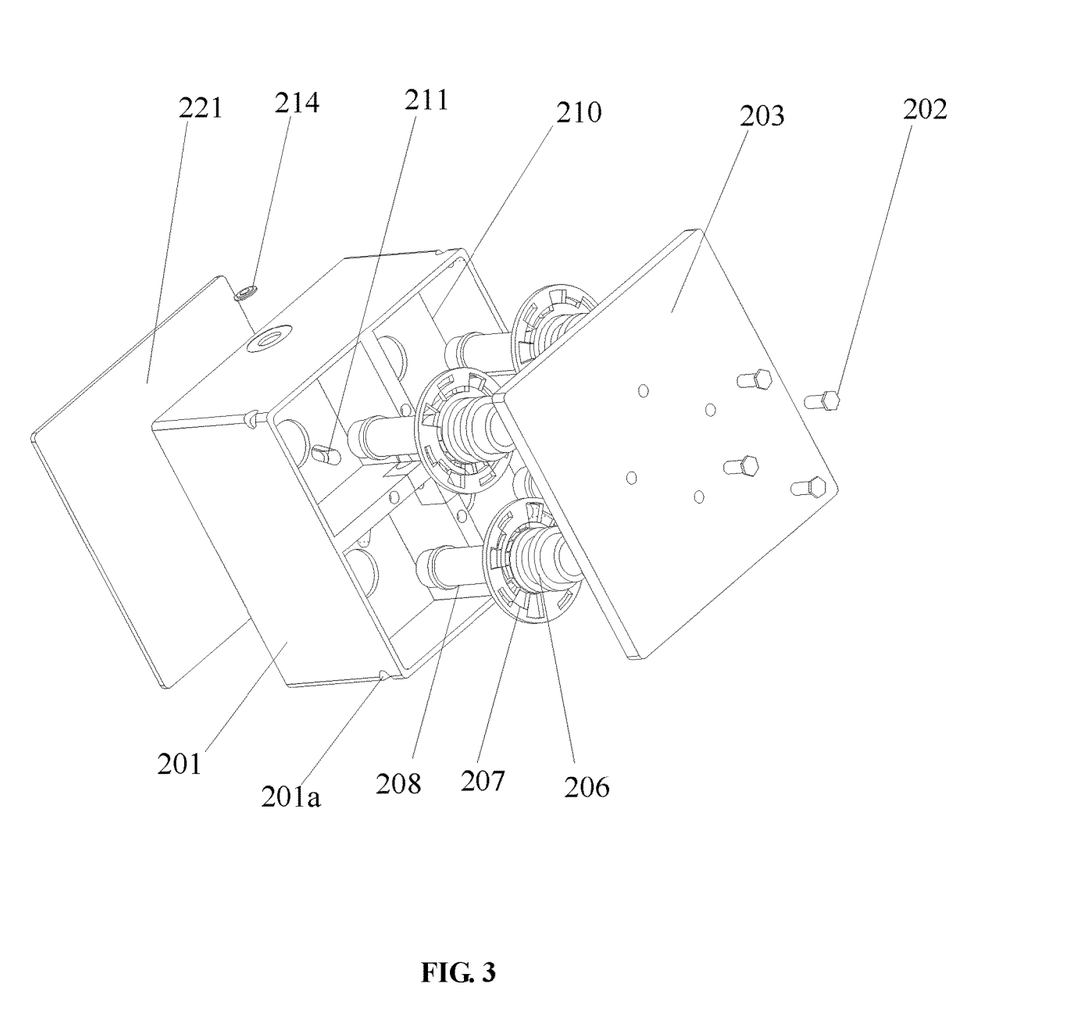
FIG. 3 is an exploded view of the multifunctional underwater 3D displacement meter of FIG. 1 from another perspective.
Figure 4:
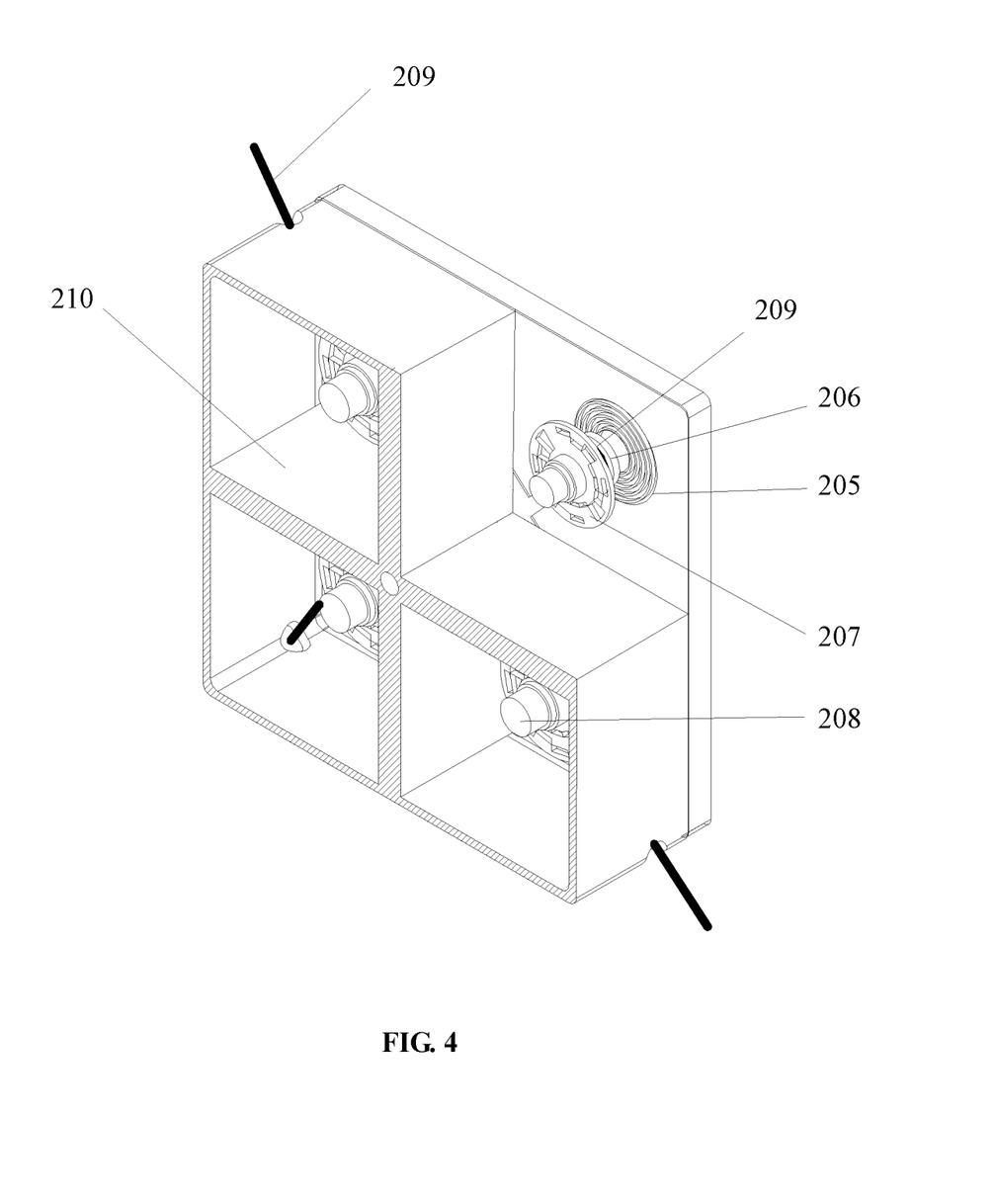
FIG. 4 is a schematic diagram of a structure in a displacement meter cavity of FIG. 1.

The multifunctional underwater 3D displacement meter 2 includes a housing 201, four rotation shafts 208, four metallic lines 209, four displacement meters and a sensor assembly. In this embodiment, the housing 201 includes an annular frame, a partition plate (not labeled in the figure), and a top cover 203 and a bottom cover 221 which are arranged at intervals one above the other and is made of stainless steel, the top cover 203 and the bottom cover 221 are mounted at an upper end and a lower end of the frame by means of fixing screws 202 respectively and sealed by means of waterproof glue, the partition plate is fixed in the middle of the frame and divides the interior of the housing 201 into a displacement meter cavity 210 and a sensor cavity 212 in the vertical direction. A cavity body in the sensor cavity 212 is a smaller sealed space, resulting in negligible buoyancy compared with the overall gravity of the multifunctional underwater 3D displacement meter 2. The four rotation shafts 208 are rotatably mounted in the housing 201 and extend in a vertical direction, one end of the rotation shaft 208 and the housing 201 are connected to a compressible spring 205. Specifically, a groove may be provided in a position, opposite the rotation shaft 208, of the housing 201, the rotation shaft 208 may be mounted in the groove, the rotation shaft 208 and at least one groove may be internally connected to the compressible spring 205, and the rotation shaft 208 may rotate in the groove. In this embodiment, the grooves are provided in the top cover 203 and the partition plate, the compressible spring 205 is located in the groove of the top cover 203, and the rotation shaft 208 is located in the displacement meter cavity 210.

Four perforations 201a penetrate the housing 201 (displacement meter cavity 210) in a circumferential direction at intervals, the metallic lines 209 correspond to the perforations 201a in a one-to-one manner, one end of the metallic line 209 is wound around the rotation shaft 208, and the other end thereof penetrates out of the perforation 201a and is connected to the metallic line 209 of the adjacent multifunctional underwater 3D displacement meter 2. In this embodiment, a hub 206 is fixed to the rotation shaft 208, one end of the metallic line 209 is wound around the hub 206, and the hub 206 is used for bearing the released and retracted metallic line 209 to limit the metallic line 209.

The plurality of multifunctional underwater 3D displacement meters 2 are arranged in a lattice, one multifunctional underwater 3D displacement meter 2 is circumferentially adjacent to four multifunctional underwater 3D displacement meters 2, and four metallic lines 209 penetrate out of the housing 201 of the multifunctional underwater 3D displacement meter 2 by means of the perforations 201a and are connected to metallic lines 209 of the four multifunctional underwater 3D displacement meters 2 in the circumferential direction to form a monitoring net. Illustratively, when a multifunctional underwater 3D displacement meter 2 below one multifunctional underwater 3D displacement meter 2 moves downwards along with the sliding mass 3, a distance between the two multifunctional underwater 3D displacement meters 2 is increased, and then the rotation shaft 208 and the compressible spring 205 rotate to release the metallic line 209; and when a multifunctional underwater 3D displacement meter 2 above one multifunctional underwater 3D displacement meter 2 moves downwards along with the sliding mass 3, a distance between the two multifunctional underwater 3D displacement meters 2 is reduced, the rotation shaft 208 and the compressible spring 205 rotate to wind the metallic line 209 around the rotation shaft 208, and due to the arrangement of the compressible spring 205, the metallic line 209 may be always in a tight state.

The displacement meters are fixed in the housing 201, that is, in the displacement meter cavity 210, and each displacement meter corresponds to the metallic line 209 for measuring a take-up and pay-off length of the metallic line 209. The displacement meter may be a magnetic displacement meter, in this embodiment, the displacement meter is a photoelectric displacement meter, and may include a light-emitting element 204, a photosensitive element 219 and optical grating discs 207, each grating disc 207 being coaxially fixed on each rotation shaft 208, the rotation shaft 208 rotating to drive the optical grating disc 207 to rotate, the light-emitting element 204 and the photosensitive element 219 being located on an upper side and a lower side of the optical grating disc 207 respectively and fixed in the housing 201, and the photosensitive element 219 being used for acquiring a rotation distance of the optical grating disc 207 so as to acquire the take-up and pay-off length of the metallic line 209. In this embodiment, the light-emitting element 204 may be fixed on the top cover 203 and located in the displacement meter cavity 210, the photosensitive element 219 may be located in the sensor cavity 212, specifically, fixed on one side, facing the bottom cover 221, of the partition plate, a light hole 211 may penetrate a position, opposite the light-emitting element 204, of the partition plate and is filled with resin and subjected to waterproof treatment.

Extending and retracting of the metallic line 209 makes the compressible spring 205 drive the rotation shaft 208 to rotate so as to drive the optical grating disc 207 to rotate, the light emitting element 204 emits light, the light passes through the optical grating disc 207 and irradiates the photosensitive element 219 by means of the light hole 211, the photosensitive element 219 converts a received light signal into an electric signal to acquire a rotation distance of the optical grating disc 207, thereby acquiring the take-up and pay-off length of the metallic line 209.

The sensor assembly includes a three-axis acceleration sensor 215, a fluxgate 216 and a water temperature sensor 217 which are fixed in the housing 201, the three-axis acceleration sensor 215 and the fluxgate 216 being used for monitoring inclination angle change and azimuth angle change of the multifunctional underwater 3D displacement meter 2 respectively. The water temperature sensor 217 is used for monitoring water temperature. In this embodiment, the sensor assembly is located in the sensor cavity 212.

A transparent monitoring window 213 may be arranged on a side wall of the sensor cavity 212, a micro camera 214 may be fixed to an inner side of the transparent monitoring window 213, and the micro camera 214 has an illuminant for observing an erosion state of the underwater sliding mass 3. An integrated circuit board 220 may be fixed in the housing 201, the integrated circuit board 220 being electrically connected to a water temperature sensor 217, a three-axis acceleration sensor 215, a fluxgate 216, a displacement meter, a micro camera 214 and a photosensitive element 219, the integrated circuit board 220 includes a single chip microcomputer for collecting, processing and transmitting monitoring data.

The data transceiver 218 is fixed in the housing 201, and in this embodiment, fixed in the sensor cavity 212, the data transceiver 218 is electrically connected to the integrated circuit board 220 to acquire monitoring data, the data transceiver includes a Zigbee or Bluetooth module, near-field communication near the multifunctional underwater 3D displacement meter 2 may be achieved, so as to form a local wireless network, the data transceiver 218 is in communication connection with the communication module 14 to gradually transmit monitoring data in the multifunctional underwater 3D displacement meter 2 to the communication module 14 in the overwater monitoring station 1, and the communication module 14 uploads the collected monitoring data to the network.

The housing 201 (bottom cover 221) and the partition plate are both provided with wire holes 222 for a waterproof wire 223 to penetrate, the wire hole 222 and the waterproof wire 223 are sealed by means of waterproof glue, the multifunctional underwater 3D displacement meters 2 are electrically connected by means of the waterproof wire 223 to form a power supply network, and the waterproof wire 223 is powered by the solar power supply device 12 so as to supply power to sensors in the whole multifunctional underwater 3D displacement meters 2.

According to three-dimensional net-type monitoring system for underwater landslide deformation provided by the present disclosure, at an initial stage, the plurality of multifunctional underwater 3D displacement meters 2 are attached to the surface of the sliding mass 3 to form a curved surface of a monitoring net adapted to the surface of the sliding mass 3, and an initial spatial posture of the monitoring net may be measured by means of the GPS devices 13 in three overwater monitoring stations 1 on the curved surface.

The water temperature sensor 217 is used for monitoring the water temperature of the position where each of the multifunctional underwater 3D displacement meters 2 is located, the three-axis acceleration sensor 215 may be used for monitoring inclination angle change of each of the multifunctional underwater 3D displacement meters 2, and the fluxgate 216 may be used for monitoring azimuth angle change of each of the multifunctional underwater 3D displacement meters 2, so as to monitor change of a single-node spatial attitude, and the displacement meter is used for acquiring the take-up and pay-off length of the metallic line, so as to calculate a distance between two adjacent multifunctional underwater 3D displacement meters 2. The micro camera 214 may observe the erosion state of the underwater sliding mass 3.

After the metallic lines 209 of the two adjacent multifunctional underwater 3D displacement meters 2 are connected to form a net, the distance between the two adjacent multifunctional underwater 3D displacement meters 2 is small since the metallic lines 209 are always in a tightened state, and each row of multifunctional underwater 3D displacement meters 2 may form a combination similar to a fixed inclinometer.

Figure 5:
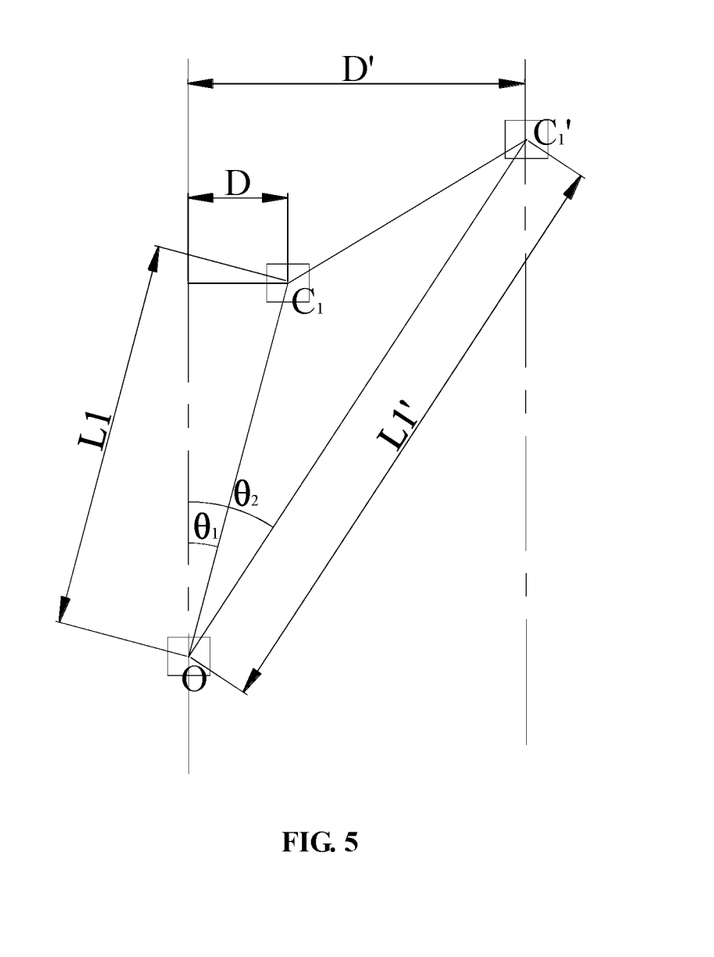
FIG. 5 is a schematic diagram of a monitoring principle in the present disclosure.

Illustratively, with reference to FIG. 5, a position of the first multifunctional underwater 3D displacement meter 2 before deformation is O, a position of the second multifunctional underwater 3D displacement meter 2 before deformation is $C_1$, a position of the second multifunctional underwater 3D displacement meter 2 after deformation is $C'_1$, the position of the point O of the first multifunctional underwater 3D displacement meter 2 may be acquired by means of the GPS device of the overwater monitoring station 1, an inclination angle of a point $C_1$ of the second multifunctional underwater 3D displacement meter 2 may be measured by means of the three-axis acceleration sensor 215, a distance $L_1$ between the point O and the point $C_1$ may be acquired by means of a length of the metallic line 209 between the first multifunctional underwater 3D displacement meter 2 and the second multifunctional underwater 3D displacement meter 2 and the take-up and pay-off length of the metallic line 209 after deformation, and a position of $C_1$ of the second multifunctional underwater 3D displacement meter 2 and a position of a bottommost multifunctional underwater 3D displacement meter 2 may be acquired by combining the following integral formula:

The position before landslide deformation:

$$D = \sin\theta_1 L_1; D_t = \sum_{i=1}^{n} \sin\theta_i L_i;$$

where i is the number of the multifunctional underwater 3D displacement meters 2 in one row, D is a horizontal distance between the first multifunctional underwater 3D displacement meter 2 and the second multifunctional underwater 3D displacement meter 2, $L_1$ is a distance between the first multifunctional underwater 3D displacement meter 2 and the second multifunctional underwater 3D displacement meter 2 before deformation of the sliding mass 3, and $\theta_1$ is an inclination angle of the second multifunctional underwater 3D displacement meter 2 before deformation of the sliding mass 3; and $D_t$ is a horizontal distance between the first multifunctional underwater 3D displacement meter 2 and the bottommost multifunctional underwater 3D displacement meter 2, $L_i$ is a distance between an ith multifunctional underwater 3D displacement meter 2 and an (i+1)th multifunctional underwater 3D displacement meter 2 before deformation of the sliding mass 3, and $\theta_i$ is an inclination angle of the (i+1)th multifunctional underwater 3D displacement meter 2 before deformation of the sliding mass 3.

The position after landslide deformation:

$$D'_1 = \sin\theta_2 L'_1, \quad D'_t = \sum_{i=1}^{n} \sin\theta_{2i} L'_{2i};$$

The horizontal position distance between the bottommost multifunctional 3D displacement meters 2 is:

$$Z = D'_t - D'_i;$$

A straight-line distance from point $C_1$ to point $C'_1$ may be calculated by the following equation:

$$L_{C_1 C'_1} = \sqrt{L_1^2 + L'^2_1 - 2 L_1 L'_1 \cos(\theta_2 - \theta_1)}$$

where i is the number of the multifunctional underwater 3D displacement meters 2 in one row, $L'_1$ is a distance between the first multifunctional underwater 3D displacement meter 2 and the second multifunctional underwater 3D displacement meter 2 after deformation of the sliding mass 3, D' is a horizontal distance between the first multifunctional underwater 3D displacement meter 2 and the second multifunctional underwater 3D displacement meter 2 after deformation of the sliding mass 3, $D_t$ is a horizontal distance between the first multifunctional underwater 3D displacement meter 2 and the bottommost multifunctional underwater 3D displacement meter 2 after deformation of the sliding mass 3, $\theta_1$ is an inclination angle of the second multifunctional underwater 3D displacement meter 2 before deformation of the sliding mass 3, $\theta_2$ is an inclination angle of the second multifunctional underwater 3D displacement meter 2 after deformation of the sliding mass 3, and $D'_i$ is a horizontal distance between an ith multifunctional underwater 3D displacement meter 2 and an (i+1)th multifunctional underwater 3D displacement meter 2 after deformation of the sliding mass 3.

Therefore, the position change between the multifunctional underwater 3D displacement meters 2 in the vertical direction may be obtained, similarly, the position change between the multifunctional underwater 3D displacement meters 2 in a horizontal direction may be obtained, and the position change of any displacement monitoring device 2 at any moment may be obtained through the calculation method.

After the monitoring net is arranged on the surface of the sliding mass 3, the monitoring net cooperatively deforms with the sliding mass 3 under the water surface 4 without external interference so as to acquire the change of a spatial posture of the monitoring net, that is, the change of the space posture of the landslide, by monitoring.

Figure 6:
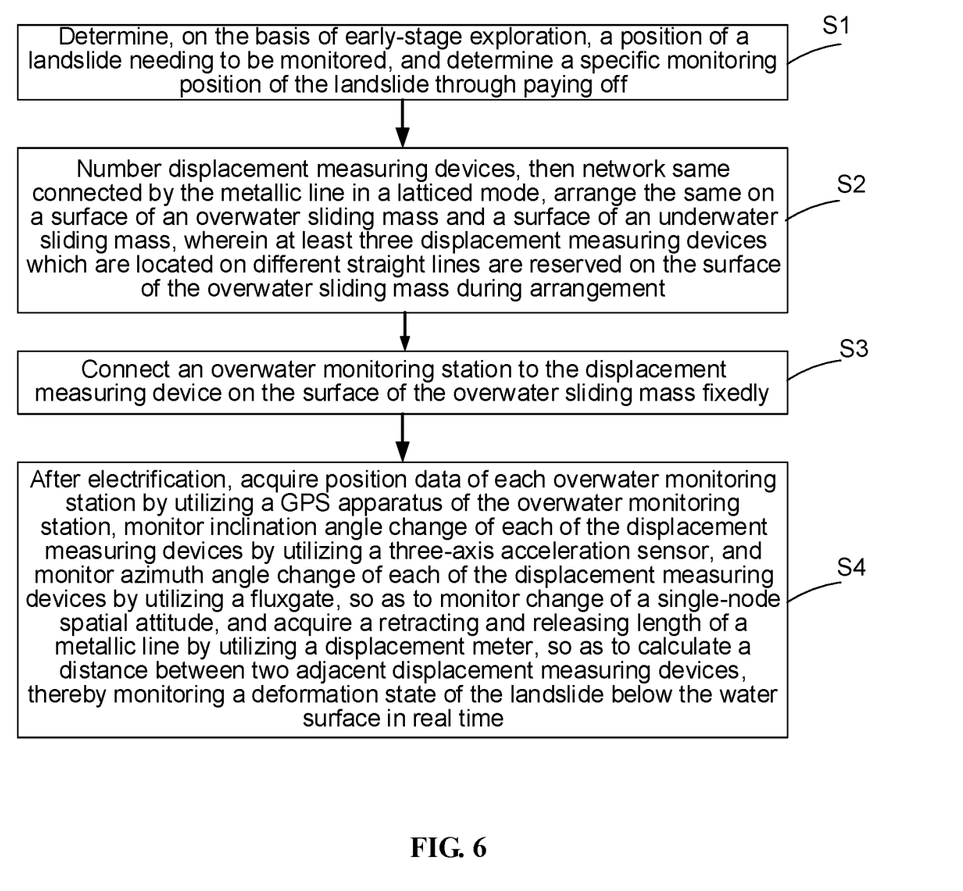
FIG. 6 is a schematic diagram of a flowchart of an embodiment of a monitoring method provided in the present disclosure.

The embodiments of the present disclosure further provide a monitoring method, including the following steps:

S1, determining, on the basis of early-stage exploration, a position of a landslide needing to be monitored, and determining a specific monitoring position of the landslide through paying off.

S2, numbering the multifunctional underwater 3D displacement meters 2, and then connecting the multifunctional underwater 3D displacement meters 2 in a latticed mode by metallic line 209 to form a net, where in this embodiment, the connecting mode is a rectangular latticed mode. The multifunctional underwater 3D displacement meters 2 are arranged on the surface of an overwater sliding mass 3 and the surface of an underwater sliding mass 3. During arrangement, all the multifunctional underwater 3D displacement meters 2 should be sequentially and orderly arranged at uniform intervals without overlapping or winding. The multifunctional underwater 3D displacement meter 2 located at an edge of the net is fixed by steel chisels or other means to avoiding leaving the original position by water flow impact. At least two rows of multifunctional underwater 3D displacement meters 2 or more than three multifunctional underwater 3D displacement meters 2 which are located on different straight lines are reserved on the surface of an overwater sliding mass 3 during arrangement.

S3, fixedly connecting at least three overwater monitoring stations 1 to the multifunctional underwater 3D displacement meters 2, which are located on different straight lines, on the surface of the overwater sliding mass 3. Specifically, the monitoring pier 11 is built through pouring, and the solar power supply device 12, the GPS device 13 and the communication module 14 are mounted on the monitoring pier 11.

S4, after energization, acquiring position data of each overwater monitoring station 1 by a GPS apparatus of the overwater monitoring station 1, monitoring inclination angle change of each of the multifunctional underwater 3D displacement meters 2 by a three-axis acceleration sensor 215, and monitoring azimuth angle change of each of the multifunctional underwater 3D displacement meters 2 by a fluxgate 216, so as to monitor change of a single-node spatial attitude, acquiring a take-up and pay-off length of a metallic line 209 by a displacement meter, so as to calculate a distance between two adjacent multifunctional underwater 3D displacement meters 2, transmitting monitoring information to a network by means of the communication module 14, and then downloading and processing data by means of a terminal, for example, a mobile phone and a computer, thereby monitoring a deformation state of the landslide below the water surface 4 in real time. Meanwhile, by means of a micro camera 214 in the multifunctional underwater 3D displacement meter 2, an erosion state of a slope surface of the landslide under the water surface 4 may be monitored in real time, and the influence of different water pressure environments and surges on the sliding mass is analyzed in combination with serial numbers. In addition, the water temperature sensor 217 may monitor changes in the water temperature environment, and may also be modified and replaced with other sensors beneficial for landslide monitoring.

Herein, the involved terms front, rear, upper, lower, etc., are defined in terms of the positions of parts and between the parts in the drawings, just for clarity and convenience of expressing the technical scheme. It should be understood that the use of such parties should not limit the scope of protection of the claimed application.

The embodiment in the present disclosure and the features in the embodiments may be combined with each other in a non-conflicting situation.

The above-mentioned are merely preferred embodiments of the present disclosure, and are not intended to limit the present disclosure. Any modifications, equivalent replacements and improvements made within the spirit and principle of the present disclosure should be included in the protection scope of the present disclosure.

What is claimed is:

1. A three-dimensional (3D) net-type monitoring system for underwater landslide deformation, comprising a plurality of overwater monitoring stations and a plurality of multifunctional underwater 3D displacement meters;

wherein the plurality of multifunctional underwater 3D displacement meters are arranged in a lattice, connected sequentially, and fixed to a surface of an overwater sliding mass and a surface of an underwater sliding mass, each of the overwater monitoring stations is fixedly connected to one multifunctional underwater 3D displacement meter on the surface of the overwater sliding mass, at least three multifunctional underwater 3D displacement meters are located on the surface of the overwater sliding mass and located on different straight lines, and a global positioning system (GPS) device is arranged on the overwater monitoring station and is used for acquiring spatial positions of the multifunctional underwater 3D displacement meters on the surface of the overwater sliding mass;

the multifunctional underwater 3D displacement meter comprises a housing, four rotation shafts, four metallic lines, four displacement meters and a sensor assembly; the four rotation shafts are rotatably mounted in the housing and extend in a vertical direction, one end of the rotation shaft and the housing are connected to a compressible spring, four perforations penetrate the housing in a circumferential direction at intervals, the metallic lines correspond to the perforations in a one-to-one manner, one end of the metallic line is wound around the rotation shaft, and the other end thereof penetrates out of the perforation and is connected to the metallic line of the adjacent multifunctional underwater 3D displacement meter; and the displacement meters are fixed in the housing, and each displacement meter corresponds to the metallic line for measuring a take-up and pay-off length of the metallic line; and the sensor assembly comprises a three-axis acceleration sensor and a fluxgate, the three-axis acceleration sensor and the fluxgate being fixed in the housing and used for monitoring inclination angle change and azimuth angle change of the multifunctional underwater 3D displacement meter respectively.

2. The three-dimensional net-type monitoring system for underwater landslide deformation according to claim 1, wherein the displacement meter comprises a light-emitting element, a photosensitive element and optical grating discs, each grating disc being coaxially fixed on each rotation shaft, the rotation shaft rotating to drive the optical grating disc to rotate, the light-emitting element and the photosensitive element being located on an upper side and a lower side of the optical grating disc respectively and fixed in the housing, and the photosensitive element being used for acquiring a rotation distance of the optical grating disc so as to acquire the take-up and pay-off length of the metallic line.

3. The three-dimensional net-type monitoring system for underwater landslide deformation according to claim 2, wherein a partition plate is arranged in the housing to form a displacement meter cavity and a sensor cavity one above the other, the displacement meter being located in the displacement meter cavity, and the sensor assembly being located in the sensor cavity.

4. The three-dimensional net-type monitoring system for underwater landslide deformation according to claim 3, wherein the light-emitting element is located in the displacement meter cavity, the photosensitive element is located in the sensor cavity, and a light hole penetrates a position, opposite the light-emitting element, of the partition plate.

5. The three-dimensional net-type monitoring system for underwater landslide deformation according to claim 1, wherein a hub is fixed on the rotation shaft, and one end of the metallic line is wound around the hub.

6. The three-dimensional net-type monitoring system for underwater landslide deformation according to claim 1, wherein a groove is provided in a position, opposite the rotation shaft, of the housing, the rotation shaft is mounted in the groove, and the rotation shaft and at least one groove are internally connected to the compressible spring.

7. The three-dimensional net-type monitoring system for underwater landslide deformation according to claim 1, wherein the sensor assembly further comprises a water temperature sensor located in the housing for monitoring water temperature, and further comprises a micro camera, a transparent monitoring window is arranged on a side wall of the sensor cavity, and the micro camera is fixed to an inner side of the transparent monitoring window and used for observing an erosion state of the underwater sliding mass.

8. The three-dimensional net-type monitoring system for underwater landslide deformation according to claim 7, wherein an integrated circuit board is fixed in the housing, the integrated circuit board being electrically connected to a water temperature sensor, a three-axis acceleration sensor, a fluxgate, a displacement meter, a micro camera and a photosensitive element for collecting, processing and transmitting monitoring data.

9. The three-dimensional net-type monitoring system for underwater landslide deformation according to claim 8, wherein the overwater monitoring station is provided with a solar power supply device, and the solar power supply device is electrically connected to all apparatuses in the multifunctional underwater 3D displacement meter and supplying power continuously in a monitoring process; and/or, the overwater monitoring station is provided with a communication module, a data transceiver is fixed in the housing, the data transceiver is electrically connected to the integrated circuit board and is in communication connection with the communication module, and the communication module is used for acquiring monitoring information of the multifunctional underwater 3D displacement meter and sending the monitoring information to a mobile monitoring terminal or a network by means of general packet radio service (GPRS).

10. A monitoring method using the three-dimensional net-type monitoring system for underwater landslide deformation according to claim 1, comprising the following steps:

S1, determining, on the basis of early-stage exploration, a position of a landslide to be monitored, and determining a specific monitoring position of the landslide through paying off;

S2, numbering multifunctional underwater 3D displacement meters, then connecting the multifunctional underwater 3D displacement meters in a latticed manner by a metallic line to form a net, and arranging the multifunctional underwater 3D displacement meters on a surface of an overwater sliding mass and a surface of an underwater sliding mass, wherein at least three multifunctional underwater 3D displacement meters which are located on different straight lines are reserved on the surface of the overwater sliding mass during arrangement;

S3, connecting an overwater monitoring station to the multifunctional underwater 3D displacement meter on the surface of the overwater sliding mass fixedly; and S4, after energization, acquiring position data of each overwater monitoring station by a GPS apparatus of the overwater monitoring station, monitoring inclination angle change of each of the multifunctional underwater 3D displacement meters by a three-axis acceleration sensor, and monitoring azimuth angle change of each of the multifunctional underwater 3D displacement meters by a fluxgate, so as to monitor change of a single-node spatial attitude, and acquiring a take-up and pay-off length of a metallic line by a displacement meter, so as to calculate a distance between two adjacent multifunctional underwater 3D displacement meters, and monitor a deformation state of the landslide below the water surface in real time.

* * * * *